(12) United States Patent
Berens et al.

(10) Patent No.: US 6,973,148 B2
(45) Date of Patent: Dec. 6, 2005

(54) CLOCK RECOVERY MECHANISM

(75) Inventors: Christopher Joseph Berens, Mentor, OH (US); Sarkis Barsamian, Middleburg Heights, OH (US); Robert Charles Kovach, Mentor, OH (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 638 days.

(21) Appl. No.: 09/727,246

(22) Filed: Nov. 30, 2000

(65) Prior Publication Data

US 2002/0064248 A1 May 30, 2002

(51) Int. Cl.[7] .............................................. H04L 7/04
(52) U.S. Cl. ..................................... 375/362; 370/503
(58) Field of Search ............................... 375/354, 362, 375/364–366, 369, 372, 373, 375; 370/503, 370/514

(56) References Cited

U.S. PATENT DOCUMENTS

| | | | | |
|---|---|---|---|---|
| 5,400,370 A | * | 3/1995 | Guo ............................ | 375/371 |
| 5,850,422 A | * | 12/1998 | Chen .......................... | 375/371 |
| 5,963,608 A | * | 10/1999 | Casper et al. ............... | 375/373 |
| 6,044,123 A | * | 3/2000 | Takla ......................... | 375/376 |
| 6,072,810 A | * | 6/2000 | Van der Putten et al. ... | 370/503 |

* cited by examiner

*Primary Examiner*—Dac V. Ha
(74) *Attorney, Agent, or Firm*—Fogg and Associates, LLC; Laura A. Ryan (57) ABSTRACT

A frequency estimate of an incoming data input is generated and transmitted with network traffic to a receiver. At the receiver, the estimate is recovered, decoded, and is used to seed an algorithm for locking the data access rate of the receiver to the incoming data. Data is buffered in buffers at each end of the system, and data flow out of the buffers is managed depending upon data rate.

4 Claims, 9 Drawing Sheets

CLOCK RECOVERY MECHANISM

The present invention relates generally to telecommunications systems, and more specifically to clock recovery in telecommunications systems.

BACKGROUND

Telecommunications systems transmit data, e.g., voice, video and other data, between endpoints over a network. In such systems, the data rate at the receive or sink end of the network is locked to the data rate at the transmit or source end. This is typically accomplished using a phase locked loop (PLL). In building PLLs, there is traditionally a tradeoff between capture range and noise in the recovered signal. The wider the capture range, that is the wider the frequency range the PLL can pick out, the more noise is present on a recovered clock signal. The reason for this is that a typical PLL contains a filter whose bandwidth controls the capture range versus noise on output. Therefore, since wide capture ranges are often desirable or even necessary, a great deal of noise can be introduced into the system. This noise contributes directly to variations at the back end of a system since the PLL filter must have a very wide bandwidth.

Data flow in such systems can start or stop rapidly and without warning due to any number of fluctuations in the data stream. The potential range of data rates in certain applications is very wide. When data flow rate changes suddenly or dramatically, the receive end PLL may lose the signal altogether. In such a situation, re-synchronization of the clock is required.

In order to provide a stable condition at the receive end, the receive clock should be synchronized with the transmit clock. Some PLLs use training clocks to get close to the desired frequency for a given startup condition as is known in the art. This, however, requires capture of a sufficient amount of data to allow the system to slew to the correct data flow rate.

The problems with previous solutions for clock synchronization is that the data rate flowing into a system can change rapidly and without warning from moment to moment, and that very stringent timing requirements exist between the transmit and receive ends of the system which are not necessarily directly supported by the network connection.

When typical PLLs acquire an incoming data signal at the receive end of a system, no presupposition of the data rate is available. The PLL circuitry contains a reference to the system's nominal data rate. This nominal frequency reference may be largely different from the actual data rate at the receive end of the system. This allows the PLL circuit to make an initial nominal guess regarding the data rate at the transmit end of the system. If the initial guess differs greatly from the actual data rate, the PLL control will gradually adjust, seeking the correct data rate. The resulting initial stages of PLL oscillation can be quite large given the high bandwidth and large variability in actual frequencies versus nominal frequencies. This potentially large oscillatory pattern in the initial stages of PLL locking takes time to settle, causing possible data buffer under- or overflow at the receive end of the system. An additional effect is the generation of an unacceptable amount of jitter at the receive PLL. This can cause unwanted effects at the ultimate receive interface (e.g. video) where clock instabilities can affect color decoding.

It would be desirable to speed up the accuracy and time for PLL capture in variable frequency situations.

SUMMARY

In one embodiment, a method for providing a seed frequency for a receive clock includes estimating a frequency of an incoming clock signal, and embedding the estimated frequency into a transmitted data stream. The embedded frequency estimate is captured, and the receive clock control loop is seeded with the estimated frequency.

In another embodiment, a telecommunications system includes a transmit end with an incoming data frequency estimator, a receive end with an estimate recovery module, and a data path between the transmit end and the receive end for conveying data and a frequency estimate of the data.

In yet another embodiment, the front end includes a user data protocol interface to receive incoming data, a frequency estimator, a data buffer having buffer control circuitry, segmentation and reassembly (SAR) logic connected to the data buffer and to the frequency estimator to combine the data and the frequency estimate into network traffic, and system interface logic to receive the network traffic from the SAR logic and to transmit the traffic along the network.

In still another embodiment, the receive end includes system interface logic to receive network traffic, segmentation and reassembly (SAR) logic to recover a frequency estimate and data from the network traffic, a buffer to hold output data, and frequency estimate determination logic to decode the frequency estimate.

Other embodiments are described and claimed.

DESCRIPTION OF EMBODIMENTS

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
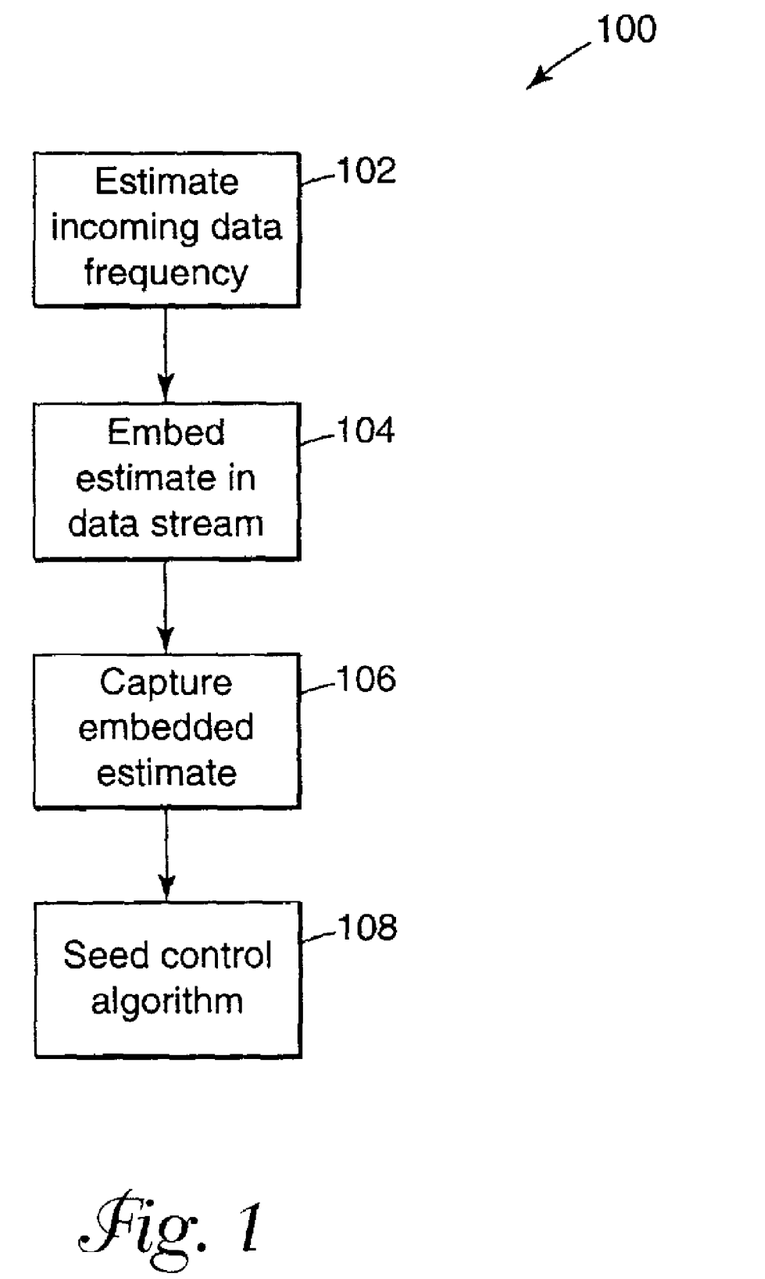
FIG. 1 is a flow chart diagram of a method according to one embodiment of the present invention.

FIG. 1 is a flow chart diagram of a method 100 according to one embodiment of the invention. Method 100 provides a seed estimate of a frequency of a clock associated with an incoming data stream (the "incoming clock signal") to the receive end of a system to advantageously improve the speed with which a clock at the receive end locks to the incoming clock signal. The method comprises estimating the frequency of the incoming clock signal in block 102, and embedding the estimated frequency into a transmitted data stream in block 104. The embedded estimation of frequency is captured at the receive end of the system in block 106, and the control algorithm or loop for a buffer management circuit is seeded with the frequency estimate in block 108.

Figures 4, 4A, 4B:
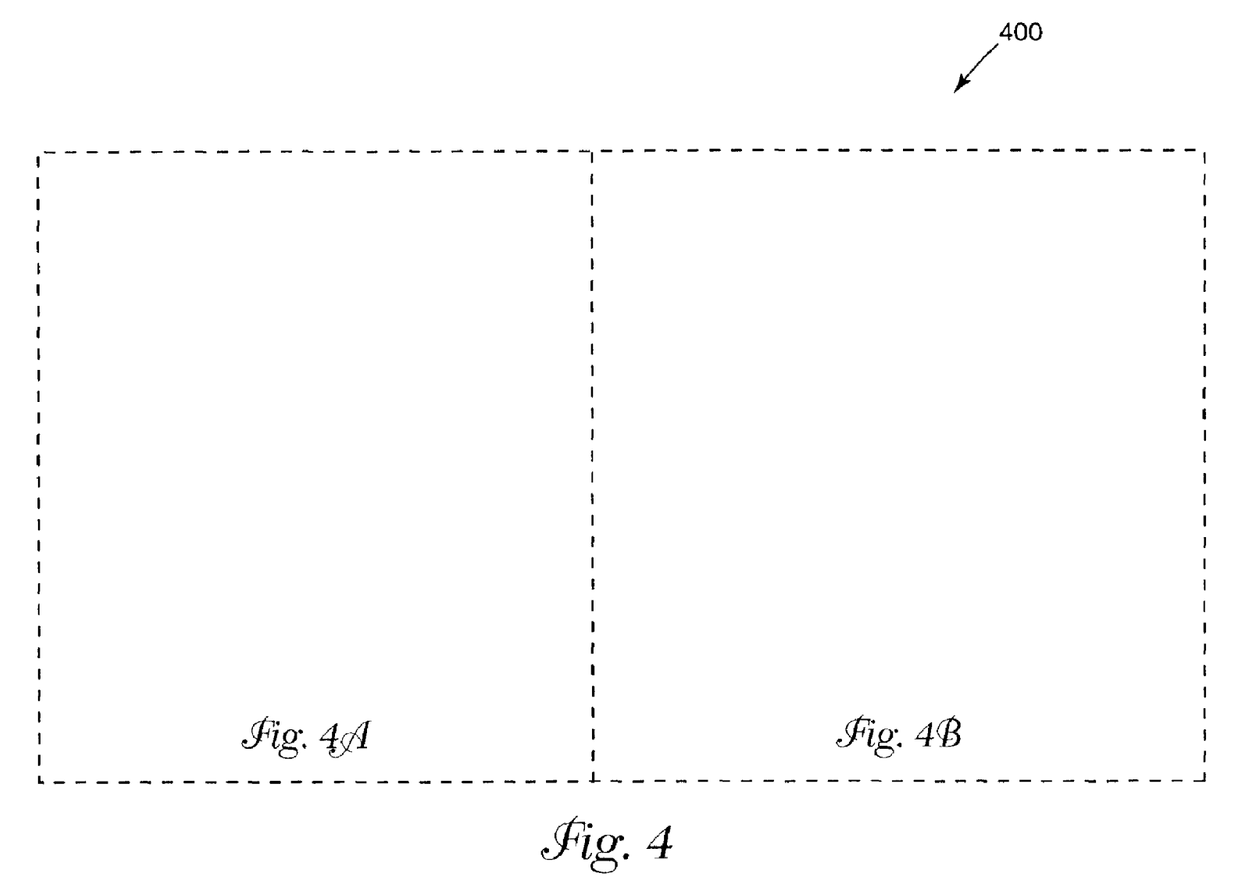
FIG. 4 is a block diagram of a receive end of a system according to an embodiment of the present invention.
FIGS. 4A and 4B are more detailed block diagrams of the embodiments of FIG. 4.
Figure 4A:
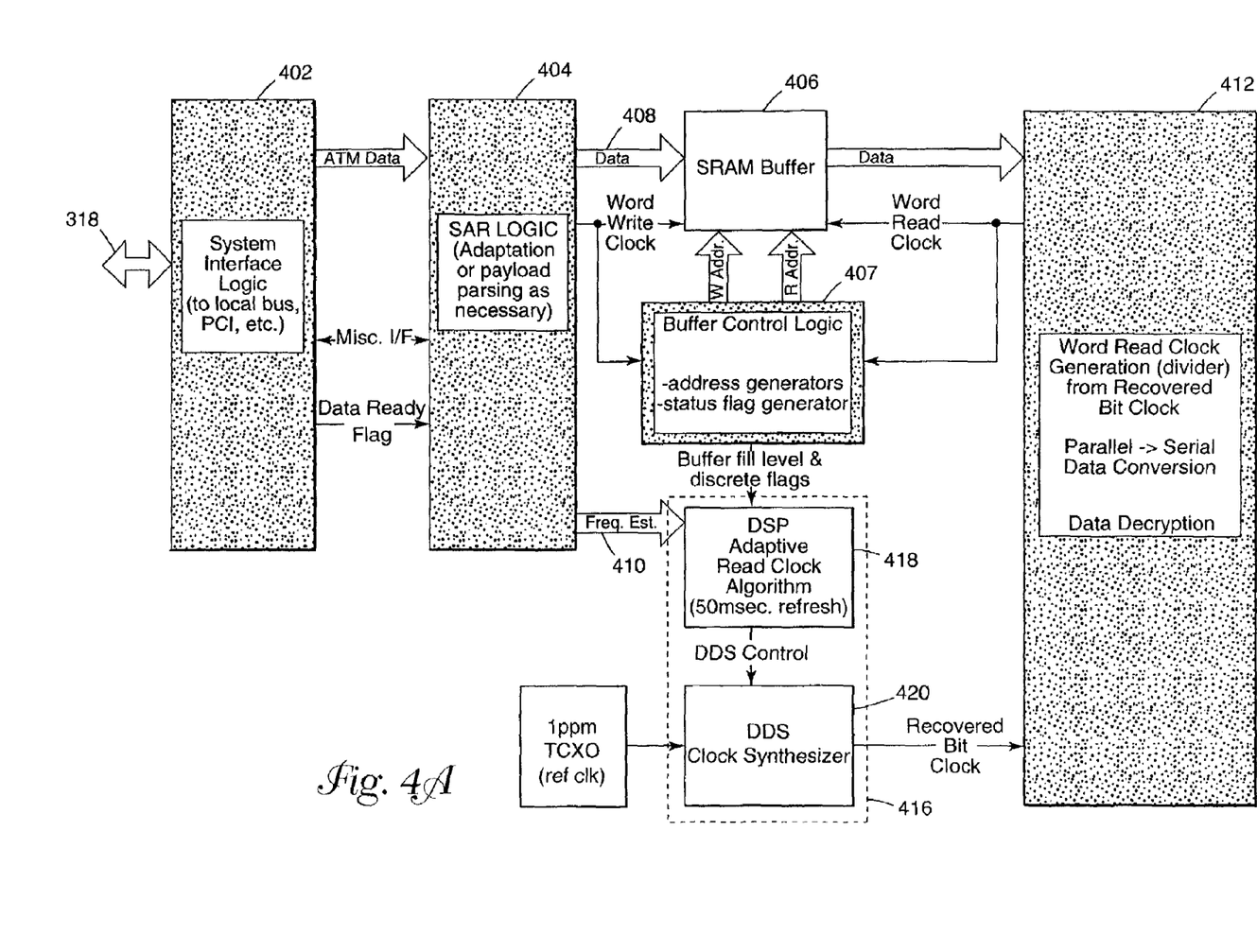
Figure 4B:
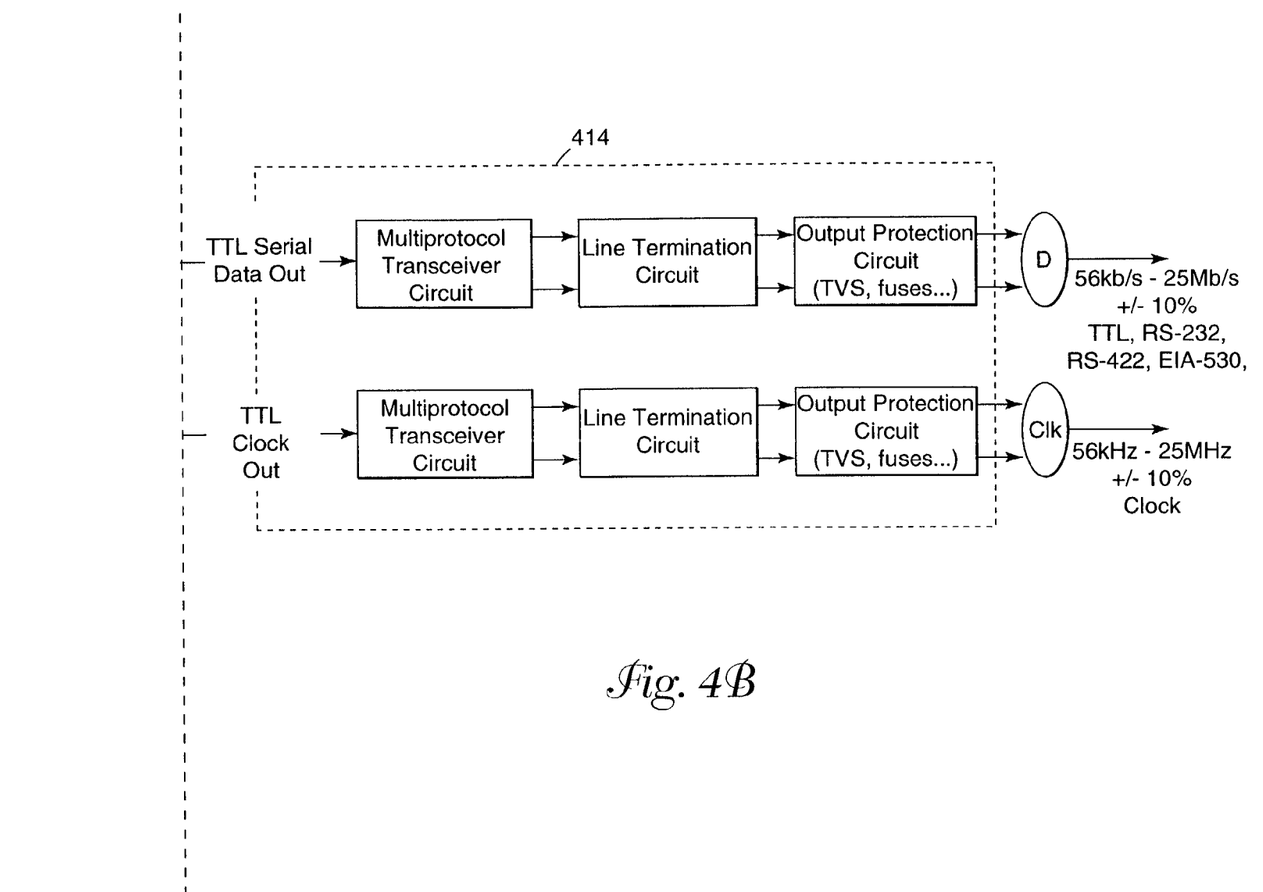

A clock recovery circuit in one embodiment includes a small digital signal processor (DSP) running a control filter program, and a digitally controlled oscillator, e.g., a direct digital synthesis (DDS) circuit (as shown in FIG. 4). The output of the DDS is used to clock data out of a buffer. An error input to the DSP control loop is a number produced by a field-programmable gate array (FPGA) based memory controller which corresponds to the fill level of the buffer. If the fill level of the buffer is kept nearly constant, then the flow of data out of the receive buffer will be on average close to the same rate as the data being received at the front end of the system at the transmit end of the network.

Typical DDS devices accept a 32 bit control word which indicates to the device a fraction of a reference clock frequency to produce at the output to control the flow rate at the receive end.

Figure 2:
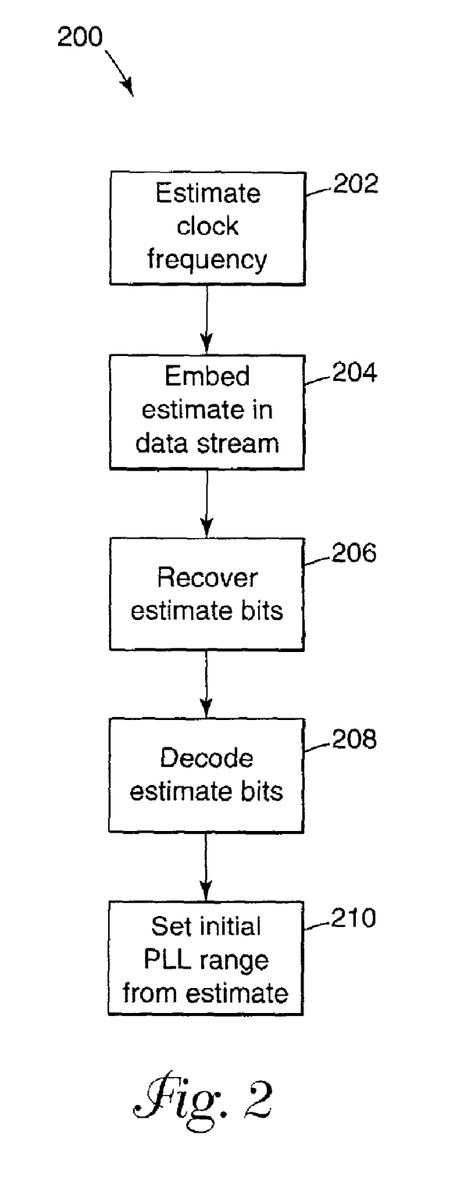
FIG. 2 is a flow chart diagram of a method according to another embodiment of the present invention.

Another telecommunications system embodiment 200 shown in FIG. 2 sends a serial bit stream to the PLL itself from the transmit end to the receive end which indicates to the digital PLL at the receiver what the range of the recovered frequency has to be. This embodiment of the present invention is entirely digital. An estimate of the incoming clock frequency is created using a predetermined number of bits in block 202, and the estimate is embedded in the data stream itself or sent with the data stream in block 204 in such a fashion that the embedded or additional data can be retrieved or separated from the data stream and recovered and decoded at the receive end to seed the control algorithm. The bits are recovered in block 206 and decoded in block 208 at the receive end. The recovered and decoded bits are used to set the initial PLL range close to the correct frequency in block 210. The PLL is in one embodiment an auto ranging PLL that can range higher and lower in frequency, but which is itself very narrow. This provides all the characteristics of a narrow band PLL but with improved variability.

Figure 2A:
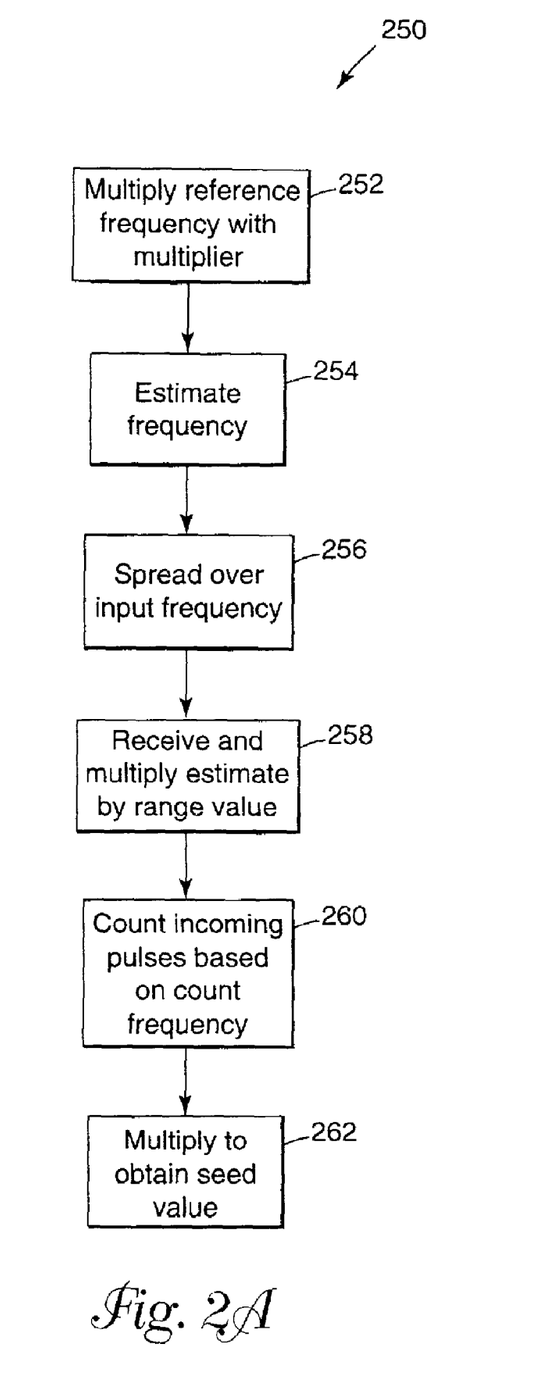
FIG. 2A is a flow chart diagram of another method according to the present invention.

One embodiment of a method 250 by which the frequency estimation is made is shown in greater detail in FIG. 2A. In this embodiment, a DDS is used. The output frequency of the DDS is determined by a 32 bit control word. The idea behind the DDS is that it can provide any submultiple of a reference frequency which is provided for it. The DDS relates the control word to output frequency as a function of the control word provided to it and a reference frequency. The transfer function for the DDS is described as follows:

$$f_{out}(x, f_{ref}) = (x/2^{32}) * f_{ref}$$

where x is the decimal equivalent of the 32 bit control word.

The Nyquist limit of half the internal reference frequency ($f_{ref}$) applies to such a situation, so the theoretical maximum output frequency of a DDS-based system ($x_{max}$) is $0.5*f_{ref}$. However, in this embodiment, for purposes of economical anti-alias filter selection and construction, the output frequency is limited to $0.4*f_{ref}$ to allow for filter design.

Since the control word for this embodiment is 32 bits, it would be ideal to send a 32 bit exact frequency over the network. However, since network traffic may not allow for such broad space, a lesser bit estimate can be provided. In this embodiment, an 8 bit estimate is discussed. However, the methods described are easily adapted to other reduced numbers of bits by scaling, and are within the scope of the invention.

To generate an 8 bit frequency estimate, for example, 0 to 0.4 times the reference frequency is spread as widely as possible over the possible range of desired DDS output frequencies to get the greatest resolution. Since the usable range of control words at the DDS is known, a 255 bit range (8 bits) is spread over the range of 32 bit values:

$$x_{max}/255 = 6.737 * 10^6$$

where $x_{max} = 0.4 * 2^{32}$ as described above.

When the estimate is received by the receiver, the receiver multiplies this value by the incoming 8 bit frequency estimation, resulting in the 32 bit DDS control word with reduced precision. For example, with a 20 MHz reference oscillator, the resolution of one least significant bit (LSB) of the 8 bit estimate, the count frequency, is:

$$countfreq = [(x_{max}/255)*20*10^6]/2^{32} = 31.37 \text{ kHz}.$$

Given the determined count frequency, the transmit end includes an oscillator that runs at the count frequency which acts as a gate for the counter. The counter then produces an 8 bit number which is what is embedded in or appended to the data traffic, and is transmitted to the receiver. The receiver performs the multiplication by $x_{max}/255$ (~$6.737*10^6$) to obtain the 32 bit DDS control word which is the frequency of the estimate, but with reduced precision.

The counter has a gate time period equal to the inverse of the 1 LSB shift, or:

$$count\_time = 1/countfreq = 31.86 \text{ microseconds}$$

At the transmit end, the counter counts, over the period of integration time, the incoming pulses. This results in an 8 bit quantity that spans the usable DDS output frequency range. The number of pulses counted over the approximately 31.86 microseconds is precisely the 8 bit quantity frequency estimate sent to the receive end. When the receiver performs the multiplication described above, a seed value for the DDS control word results. This allows the control loop for the receive end to converge the system more quickly to the actual frequency.

For example, if over the approximately 31.86 microsecond time period, 255 pulses are counted, the frequency represented in the 8 bit result obtained using the method above is:

$$255*(1/count\_time) = 8*10^6 \text{ Hz} = 8 \text{ MHz}$$

This is equal to the maximum DDS output frequency as defined above, that is $0.4*20$ MHz.

In another embodiment, the estimation system and method is implemented in FPGA logic. In this embodiment, a 20 MHz reference oscillator is used as a reference to the DDS. The signal is fed to the FPGA to coordinate estimation logic as follows. Using 20 MHz as a reference, the multiple of 20 MHz cycles that most closely adds up to the count_time of 31.86 microseconds is:

$$cycles = 20*10^6/countfreq = 637.5$$

The FPGA counts in this embodiment input frequency pulses during this time. The counter is enabled for 638 reference clock cycles. The count obtained is the frequency estimate which is sent over the network to the receive end. Receiver logic pulls this 8 bit frequency estimate and multiplies it by $x_{max}/255$ to get the nearest representation of the 32 bit DDS control word. The FPGA is then used to count input frequency pulses during the time when the device is configured as a transmitter. Once the 8 bit counter is enabled for the 638 reference clock cycles, the counter value is transmitted over the network, and the recovered bits are used to generate the frequency estimate for seeding the receive end.

In another embodiment, estimating the frequency of the incoming clock signal comprises generating an 8 bit estimate of the frequency.

Figures 3, 3A, 3B:
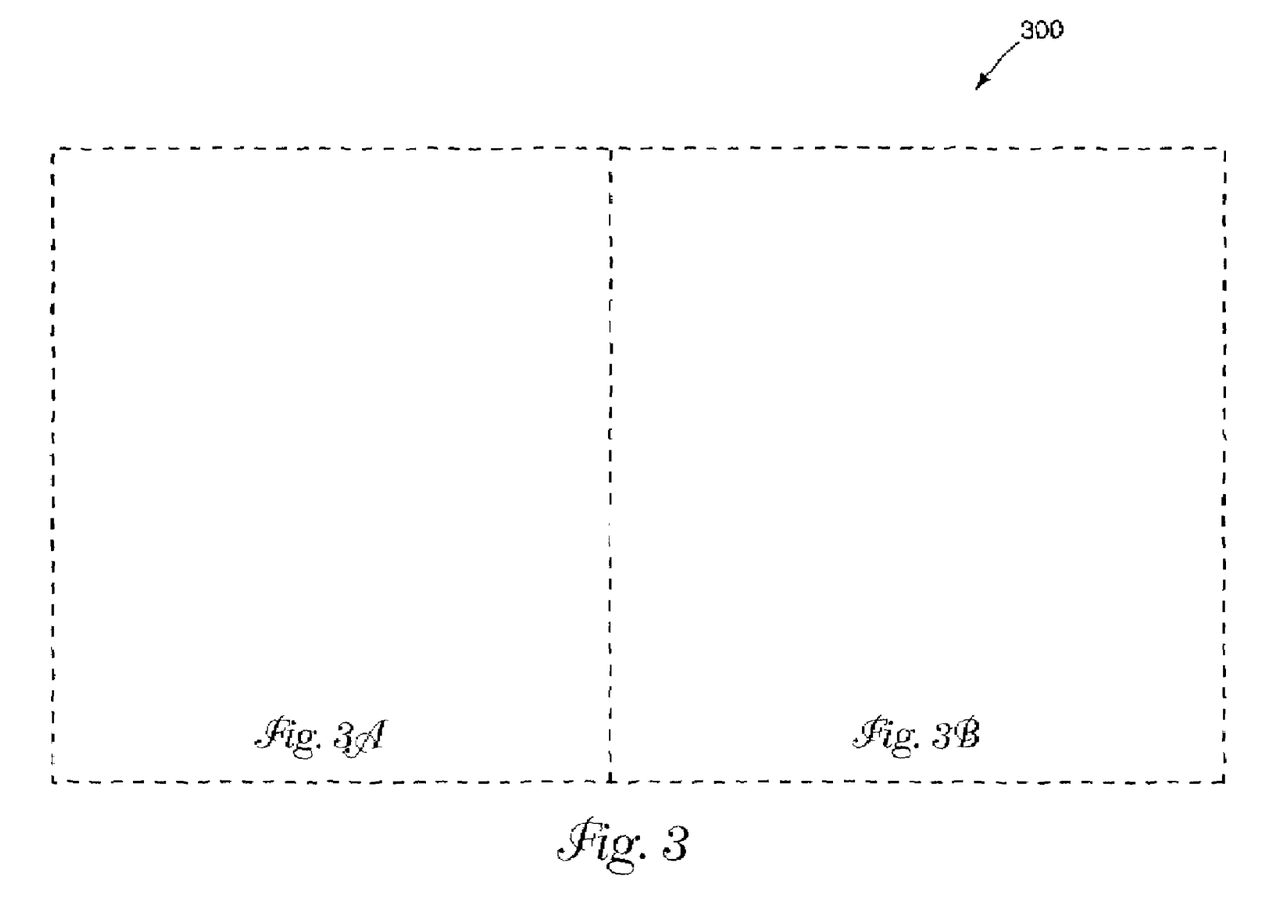
FIG. 3 is a block diagram of a transmit end of a system according to an embodiment of the present invention.
FIGS. 3A and 3B are more detailed block diagrams of the embodiment of FIG. 3.
Figure 3A:
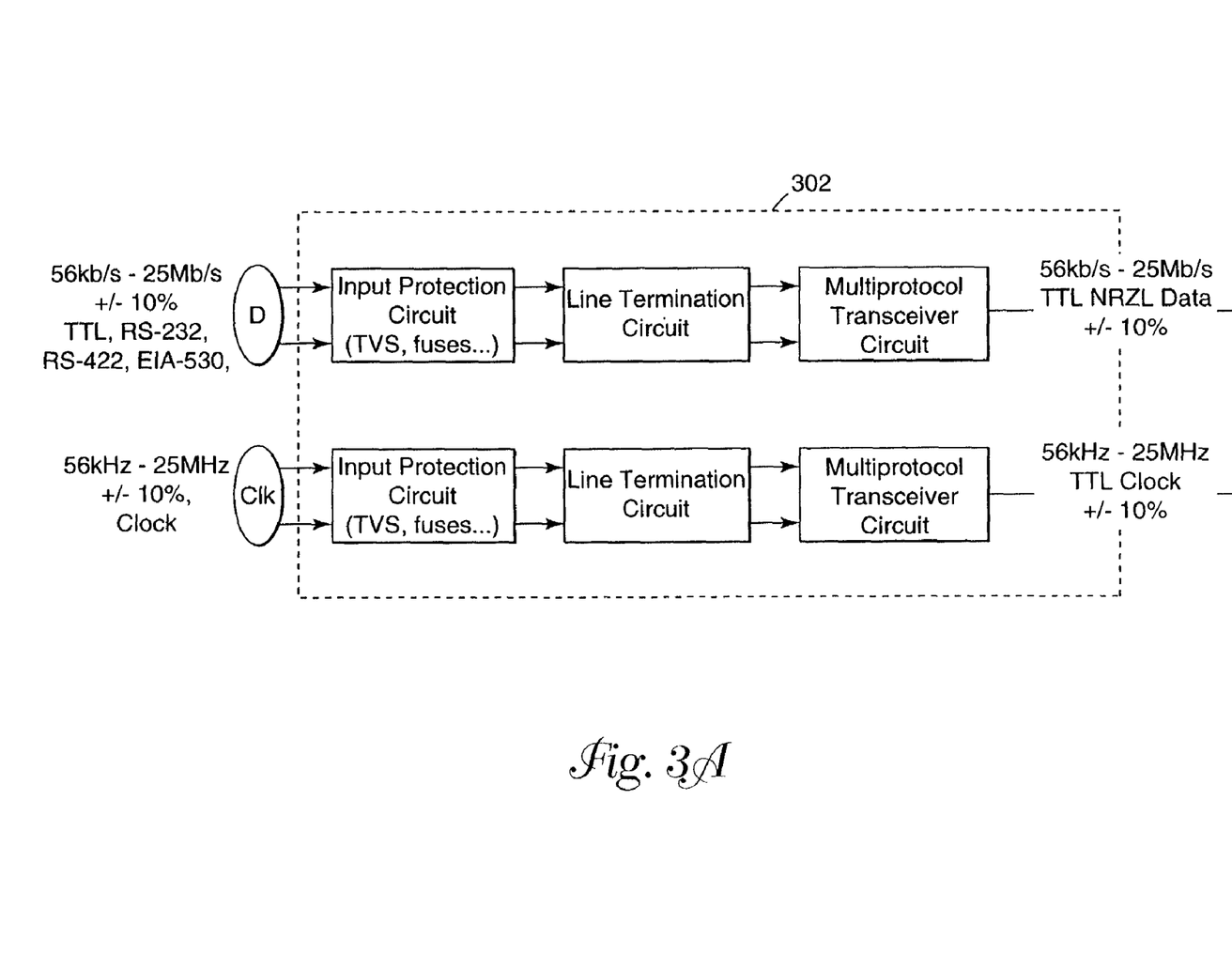
Figure 3B:
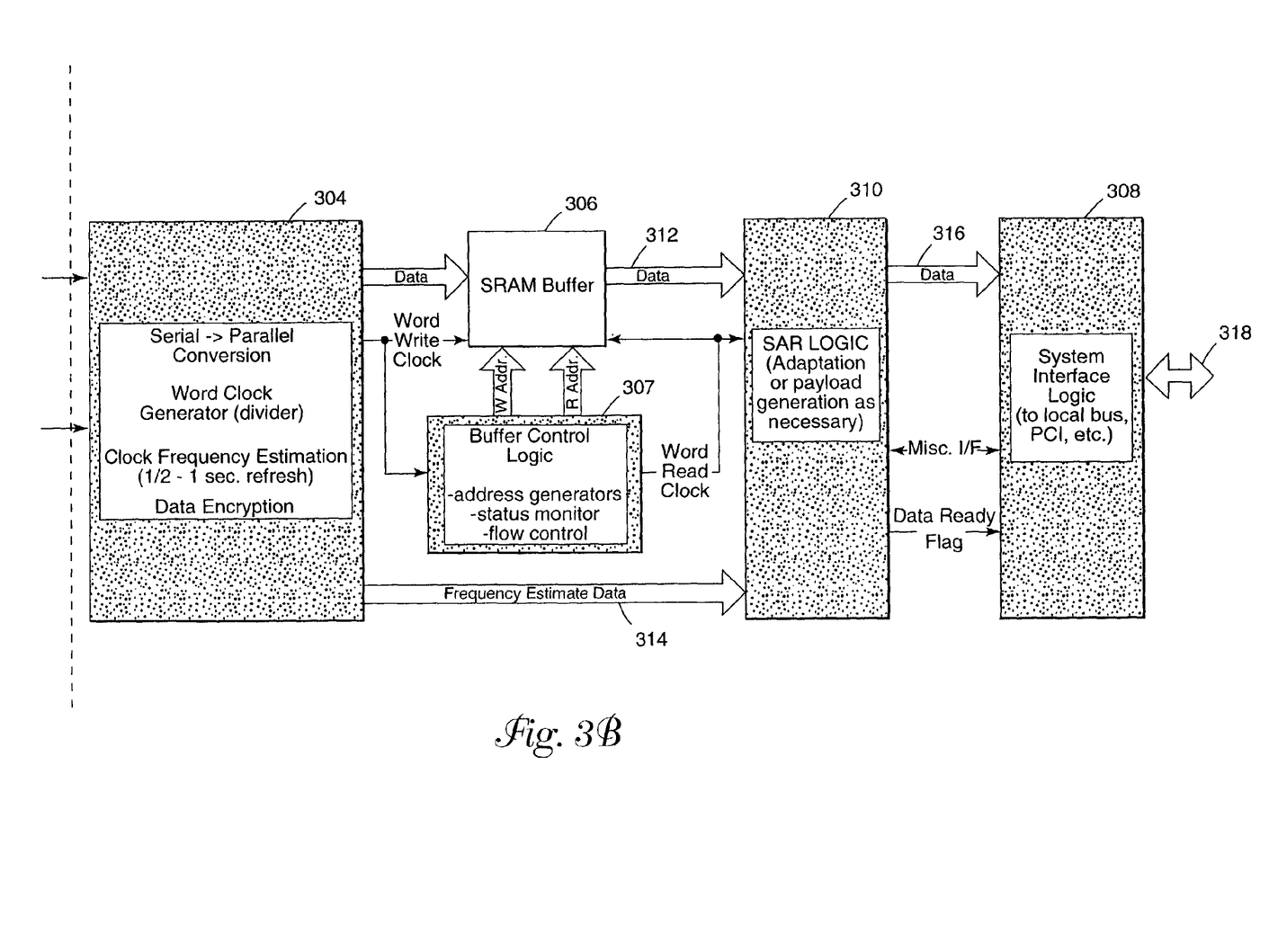

A front end transmit section of a system 300 is shown in block diagram in FIGS. 3, 3A, and 3B. In this embodiment, data is brought into the system at user data protocol interface 302, and presented to frequency estimator 304. In frequency estimator 304, the incoming data is converted from serial form to parallel form if necessary. Before flowing through the buffers 306 and related buffer circuitry 307, onto the system such as a local bus, PCI bus, or the like at system interface logic 308, frequency estimator 304 creates an estimate of the frequency of the incoming data stream as described above. The estimate is then encoded or embedded into the network traffic itself in ATM SAR logic 310. Logic 310 receives data 312 from the SRAM buffer 306 and frequency estimation data 314 from the estimation block 304, and embeds or appends the frequency estimation data into or with the data 312 to create ATM data containing both the data 312 and the frequency estimate 314.

Frequency estimation data 314 takes several different forms in different embodiments. By way of example and not limitation, no more than 8 or 16 bits of information may be available in network traffic. These 8 or 16 bits are in one embodiment programmed with an 8 bit frequency estimate at the transmit end of the system and embedded into the ATM data 316 output from block 310 to form network traffic 318.

In another embodiment, the receive end 400 of a system is shown in block diagram form in FIGS. 4, 4A, and 4B. In this embodiment, receive end 400 receives ATM network traffic 318 into system interface logic 402 and conveys the information to ATM SAR logic 404. In ATM SAR logic 404, the incoming data is separated to recover the frequency estimate bits from the data stream to provide the data 408 and the frequency estimate 410. The data 408 is presented to the SRAM buffer 406 and related buffer circuitry 407 and the frequency estimate 410 is presented to a clock recovery circuit 416.

In one embodiment, clock recovery circuit 416 comprises digital signal processing (DSP) logic 418 running an adaptive read clock algorithm, and DDS clock synthesizer 420. The DSP logic 418 implements in one embodiment the digital equivalent of an analog filter to generate the DDS control word using the frequency estimate as a seed and using the buffer fill levels from buffer control logic 407. The DDS control word is conveyed to the DDS clock synthesizer 420. The DDS clock synthesizer receives the DDS control word, and provides any desired sub-multiple of a reference frequency provided for it. The DDS relates the control word to the output frequency as a function of the control word provided and a reference frequency $f_{ref}$. The DDS in another embodiment contains a reference clock multiplier to allow lower frequency oscillators to be used.

In another embodiment, an 8 bit estimation stream is sent before or after the network traffic with header indicators allowing the stream to be captured at the sink or receive end, decoded, and sent to the PLL for frequency estimation at the receive end. Other methods by which the data are sent to the receive end will be readily known by those of skill in the art, and are within the scope of the invention. It is sufficient that the estimation data are sent to the receive end, captured there, and decoded for presentation to the PLL for seeding the frequency.

Whether the frequency estimation data are transmitted embedded in network traffic or separate from network traffic, they are transmitted across the network to the receive end. When the data are recovered at the receiver, they are decoded to provide the seeding frequency at the receive end. Provided sufficient buffer depth, the provision of the frequency estimate to the receive end allows the system to be started or initialized close to the frequency of the incoming data stream, thereby reducing the amount of time to lock and oscillatory action at the receive end. Provided the receive end buffer is of sufficient depth, by the time the buffer is approximately half full, the estimate of the data flow rate is known, and the read out of data at the receive end from the buffer is very close to the rate at which it is flowing in.

Figure 5:
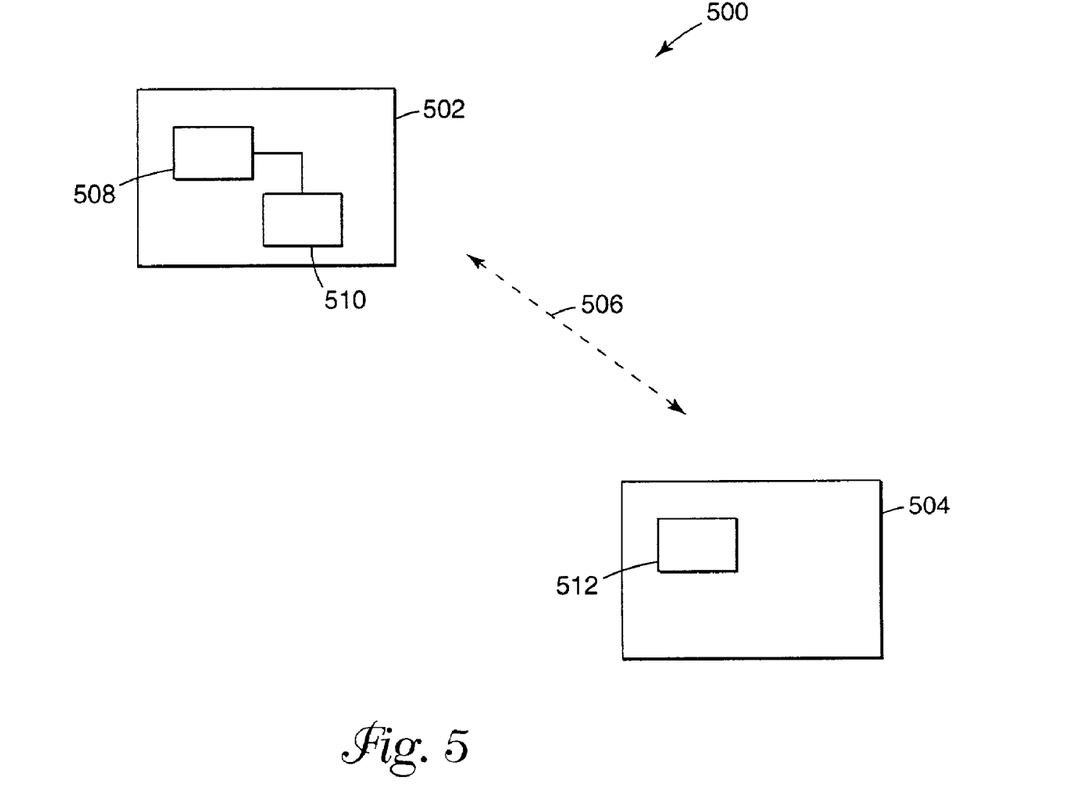
FIG. 5 is a block diagram of a telecommunications system according to an embodiment of the present invention.

In another embodiment, a telecommunications system 500 is shown in FIG. 5. System 500 comprises a transmit or front end 502 and a receive end 504. In this embodiment, transmit end 502 and receive end 504 communicate over a telecommunications network 506. Transmit end 502 comprises frequency estimator 508 for creating an estimate of the frequency of an incoming data stream, and encoder 510 for embedding or transmitting the frequency estimate data in network traffic to the receive end 504. Receive end 504 comprises clock recovery circuit 512 to decode the frequency estimate from the network traffic, to generate a DDS control word, and to seed a control algorithm with the DDS control word.

In one embodiment, the buffer in which incoming data are stored is programmable in depth. In this embodiment, a ratio of approximately half of the buffer is kept full at all times to facilitate throughput delay management.

The estimates in the various embodiments are not enough to completely specify the frequency, but are estimates sufficient to seed the receive end frequency rate close enough to reduce the amount of oscillation in the locking sequence to the incoming frequency. Adaptation to changes in frequency is therefore capable of being performed very quickly.

In another embodiment, once the system is running and well tuned to the incoming data frequency, further estimates of the current incoming data flow rate are provided to the receive end of the system to allow changes to the receive end PLL, allowing retuning of the PLL frequency quickly in case of changes in the incoming flow rate. This run time adjustment of the frequency allows close buffer management even in highly variable situations. For example, if the connection to the transmit end is lost, the frequency estimation allows the receive end to see the loss coming and to take action or preventive measures if they are available to prevent data loss or system failure.

The embodiments of the present invention are useful in situations with very low bandwidth of a low bit rate, since by sending the estimate at network speed, which in these types of situations is generally much faster, the PLL is quickly adjusted to a frequency close to the actual frequency, and is ready and locked as the slower data comes into the receive end of the system.

Further, while the embodiments described above are discussed in terms of ATM networks, the invention is not so limited. It is also applicable to IP networks. In fact, it may be even more useful in internet protocol (IP) type networks where the transport infrastructure is not necessarily slaved to a high-accuracy clock source as is the case in most ATM networks, which are traditionally carried over infrastructures (e.g. SONET) which are synchronous in nature.

CONCLUSION

In a time window defined by a count frequency, incoming pulses to a transmit end of a telecommunications network are counted. The count of pulses is in one embodiment an 8 bit frequency estimate which is embedded in or sent along with network traffic to the receive end of the system. An adaptive DSP system at the receive end receives the 8 bit estimate and generates a 32 bit control word estimate of the frequency of the incoming data stream. The adaptive clocking system begins operation with the determined output frequency.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of recovering a clock signal for a buffer, the method comprising:
   buffering incoming data in a buffer;
   formulating a frequency estimate based on a data rate of the incoming data;
   providing the frequency estimate and the incoming data to an asynchronous transfer mode (ATM) segmentation and reassembly sublayer;
   encoding the frequency estimate into ATM traffic;
   sending the ATM traffic to a receiver; and
   seeding a frequency lock algorithm with the estimate.

2. The method of claim 1, wherein seeding a frequency lock algorithm comprises:
   recovering the frequency estimate from the received ATM traffic; and
   decoding the estimate.

3. The method of claim 1, and further comprising:
   adjusting a depth of the input buffer to facilitate throughput management.

4. The method of claim 1, and further comprising:
   buffering received data in an output buffer; and
   adjusting a depth of the output buffer to match the inflow of data at the input buffer.

* * * * *